United States Patent [19]

Sato

[11] Patent Number: 4,756,248
[45] Date of Patent: Jul. 12, 1988

[54] LOW MASS GRAIN SUPPORT SYSTEM FOR SOLID PROPELLANT ROCKET MOTORS

[75] Inventor: Tomio Sato, Huntsville, Ala.

[73] Assignee: Morton Thiokol, Inc., Chicago, Ill.

[21] Appl. No.: 101,906

[22] Filed: Sep. 28, 1987

[51] Int. Cl.$^4$ ................................................. C06D 5/06
[52] U.S. Cl. ..................................... 102/287; 102/290; 102/291; 60/219; 60/255; 60/256
[58] Field of Search .................. 60/219, 255, 256; 102/287, 289, 290, 291

[56] References Cited

U.S. PATENT DOCUMENTS

| 4,378,674 | 4/1983 | Bell | 60/39.823 |
| 4,428,785 | 1/1984 | Suzuki et al. | 149/19.4 |
| 4,594,945 | 6/1986 | Alexandris | 102/287 |
| 4,649,823 | 3/1987 | Bell | 102/289 |

Primary Examiner—Peter A. Nelson
Attorney, Agent, or Firm—Gerald K. White

[57] ABSTRACT

A reinforced split-flap hinge for supporting the unpressurized propellant grain of a rocket motor in a high acceleration environment includes a circular piece of material and an afterwardly spaced first annular piece of material bonded to the convex forward surface of the propellant grain, the material of the circular piece of material and the first annular piece of material being chopped fibers of insulating material in a rubber matrix, with a second annular piece of material bonded to the surface of the circular concave piece of material, the convex forward surface of the propellant grain, and the surface of the first annular piece of material, a third U-shaped annular piece of material having first and second skirts extending aft with a first skirt bonded to the surface of the second annular piece of material, the second and third annular pieces of material being made of fabric reinforced polyisoprene, and a fourth annular piece of insulating material made of powder filled polyisoprene positioned between the forward inner wall of the rocket motor case and the third annular piece of material and bonded on one side to the inner wall of the case and on the other side to the second skirt of the third annular piece of material.

7 Claims, 2 Drawing Sheets

LOW MASS GRAIN SUPPORT SYSTEM FOR SOLID PROPELLANT ROCKET MOTORS

BACKGROUND OF THE INVENTION

1. Field of the Invention

This invention relates to a support system for the solid propellant grain in a rocket motor, and more particularly, to a support system having particular utility for supporting the unpressurized propellant grain of a rocket motor in a high acceleration environment. Typically, the upper stages of multistage interceptor rockets are exposed to such an environment.

2. Description of the Prior Art

Solid propellant rocket motors utilize a high strength cylindrical case having a thin wall into which the propellant grain is cast and cured with a layer of a suitable insulating material positioned between the propellant grain and the interior wall of the case. The case is closed at the forward end thereof and has a nozzle at the aft end for the emission of exhaust gases. For relieving the propellant grain of stress encountered in a high axial acceleration environment, it has been the practice to provide a split flap hinge support structure at the forward end of the case, interiorly thereof, for attaching the forward end of the propellant grain thereto.

Conventional stress relieving split-flap hinge structures for attaching the forward end of the propellant grain to the inner forward end of the rocket motor case include materials comprising chopped fibers of an aramid, glass, asbestos, etc. in a rubber matrix. Aramids include poly (benzamides) and the family of materials marketed by E.I. DuPont de Nemours & Company of Wilmington, Delaware, under the trademark KEVLAR. These materials usually have a tensile modulus, at room temperature and at a strain rate of 0.74 inches-/inch/minute of less than eight thousand pounds per square inch (psi). Tensile modulus, also referred to as Young's modulus, generally is designated by the symbol "E". For the conventional or prior art stress relieving split-flap structures described, the tensile modules thus may be expressed as $E < 8{,}000$ psi.

Stress relief for the propellant grain in a rocket motor can be achieved with grain support tubes, contoured slots, low stress configurations, or internal grain support. Such arrangements for achieving stress relief in the propellant grain have disadvantages, however, of reducing the loading density, or mass fraction, in the rocket motor and/or of adding weight. Mass fraction is the ratio of the mass of the propellant grain in a rocket motor case to the total mass that could be put in the case if it were completely filled.

A need exists for improvement in the systems or structures provided for supporting the unpressurized propellant grain of a rocket motor having an axisymmetric geometry in a high axial acceleration environment that minimized the amount of propellant lost with minimal inert weight penalty. The present invention was devised to fill the technological gap that has existed in the art in this respect.

SUMMARY OF THE INVENTION

A general object of the invention is to provide an improved system for supporting the unpressurized propellant grain of a rocket motor having an axisymmetric geometry in a high axial acceleration environment.

A specific object of the invention is to provide a low cost and low mass support system for supporting the unpressurized propellant grain in such an environment.

In accomplishing these and other objectives of the invention, there is provided a reinforced split-flap hinge support system for reducing stress/strain in the propellant grain by local reinforcement, which support system includes, in addition to the standard or conventional insulation of chopped fibers in a rubber matrix, a unique combination of fabric reinforcements in a rubber matrix. Much stiffer insulating material can be obtained by fabric reinforcements in a rubber matrix. Tests conducted of fabric reinforced insulation indicate a ten-fold increase in Young's modulus. A Young's modulus as high as 80,000 psi has been determined using KEVLAR fabric.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying drawings which form part of the application, of which.

DESCRIPTION OF THE PREFERRED EMBODIMENT

Figure 1:
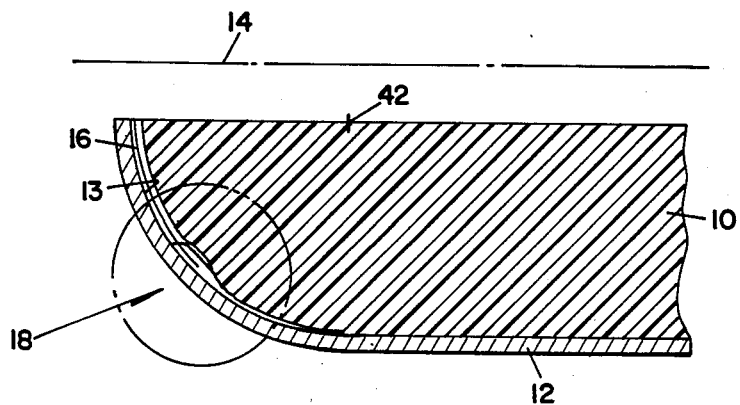
FIG. 1 is a fragmentary sectional view of the forward end of a solid propellant rocket motor having an axisymmetric geometry and incorporating the reinforced split-flap hinge according to the present invention.

In FIG. 1 a propellant grain 10 having an axisymmetric geometry is shown in an elongated axisymmetric cylindrical case 12 having a cylindrical inner wall, the forward inner end surface 13 of which is rounded and a longitudinal axis 14. Positioned between the grain 10 and the inner wall of case 12 is an insulating layer 16 of suitable material. Case 12 may be a composite or filament-wound casing.

Figure 1A:
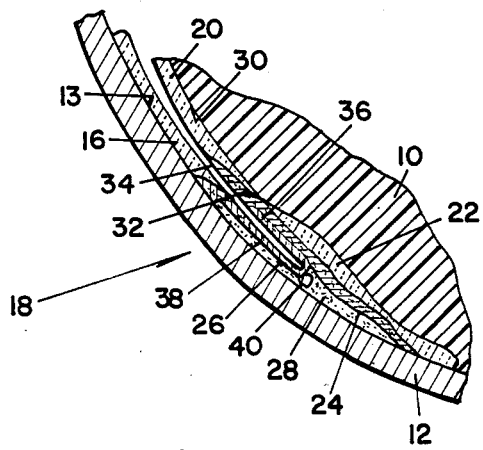
FIG. 1A is an enlarged view of the reinforced split-flap hinge portion of FIG. 1 that is encircled in dotted lines.

Supporting and retaining the propellant grain 10 at the forward end convex surface thereof to the inner wall 13 of case 12 is a reinforced, that is, stiffened, split-flap hinge system indicated generally by reference number 18. As best seen in FIG. 1A, the reinforced hinge system 18 includes a combination of insulating materials comprising axially spaced pieces of material or components 20 and 22 of conventional or standard chopped fiber insulating material in a rubber matrix, first and second pieces of material or components 24 and 26, respectively, of fabric reinforced polyisoprene in a rubber matrix, and a piece of material or component 28 of powder filled polyisoprene in a rubber matrix.

Insulation piece or component 20 is a circular concave piece of material and conforms in shape to the convex forward surface portion 30 of the propellant grain 30 to which it is bonded. Insulation piece or component 22, for convenience hereinafter termed a first annular piece of material, is annular and generally conical in form, and also is bonded to the convex forward surface portion 30 of grain 10.

Component 22 is axially displaced aft of component 20 whereby an intermediate annular surface portion 32 of grain 10 is covered by neither of the components 20 and 22.

Insulation piece or component 24, for convenience, termed a second annular piece of material, is annular and generally conical in form and is bonded in a scarfing manner at its forward end to the aft end of component 20 and to the annular surface 30 of grain 10. Component 24 is bonded to the adjacent surface of component 22 and extends aft in overlapping relationship therewith, stopping short, however, of the aft end of component 22. The aft ends of components 22 and 24 are both bonded to the inner wall 13 of case 12.

Insulation components 26 and 28, for convenience, termed third and fourth annular pieces of material, are both annular and generally conical in form and are positioned in a space 34 between component 24 and the inner wall 13 of case 12, with component 26 being positioned between components 24 and 28. Component 28, at the aft end thereof, is sandwiched between component 24 and the inner wall of case 12. Component 26 is in the form of an annular U-shaped hinge having first and second skirt members 36 and 38. One skirt member 36 of the hinge comprising component 26 is bonded to the adjacent surface of component 24 and the other skirt member 38 thereof is bonded to the adjacent surface of the component 28. The juncture 40 of the skirt members 36 and 38, as best seen in FIG. 1A, is located aft of the component 20 in a region intermediate the width of component 28.

Insulation component 24, being fabricated from a fabric of glass, KEVLAR and/or graphite in a rubber matrix is much stiffer than insulating materials made of chopped fibers of KEVLAR, glass, asbestos, etc. in a rubber matrix.

The function of the stiffened insulation is to provide support for the grain by distributing the local effect at the reinforced hinge component 26 over a large area. Continuous fibers around the hinge component 26 provide the strength to resist flap opening loads. The isotropic property of the powder filled insulation component 28 provides the strength necessary in the through thickness direction and also serves to fill the discontinuities of the several other component layers. Lay-up of the various layers of the reinforced hinge system 18 may be accomplished with uncured (B stage) polyisoprene, and then cured as an integral unit with the propellant after pouring of the latter in case 12, in a manner known to those skilled in the art.

It has been determined that the hinge location, as well as the lay-up materials, affects the performance of the reinforced split-flap hinge support system according to the invention. The hinge location shown in FIG. 1 with the juncture 40 of the hinge component 26 positioned at an angle of about 35° to the longitudinal axis 14 from the center of curvature designated 42, of the inner wall 13 of the forward end of case 12, was found to be near optimum for a motor and loading that was considered to illustrate the utility of the invention.

Figure 3:
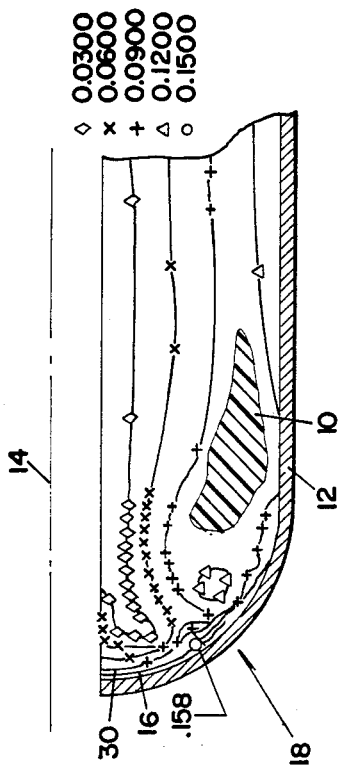
FIG. 3 is a fragmentary sectional view that is similar to FIG. 2 and shows the maximum principal strain contours for the reinforced split-flap hinge according to the invention.
Figure 2:
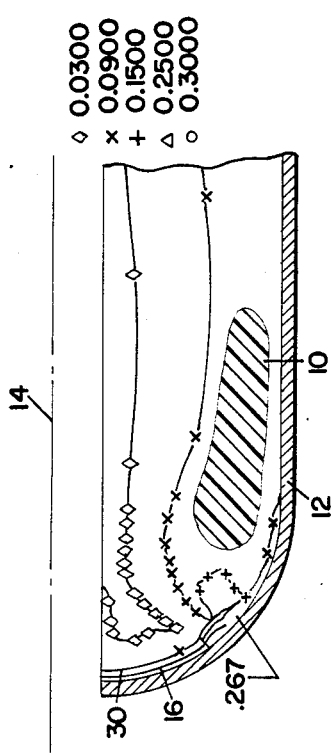
FIG. 2 is a fragmentary sectional view that is similar to FIG. 1 and shows the maximum principal strain contour for a conventional split-flap hinge, with stresses or strains of equal value being represented as on a contour plot.

Stress analysis of a typical motor grain 10 under axial acceleration of 350 g's and a modulus of $E=440$ psi for the flap material, as shown in FIG. 2, and a high modulus of $E=60,000$ psi for the insulator at the reinforced split-flap hinge component 26, according to the invention, as shown in FIG. 3, indicate a significant reduction of 40% in strain in the propellant grain.

Figure 5:
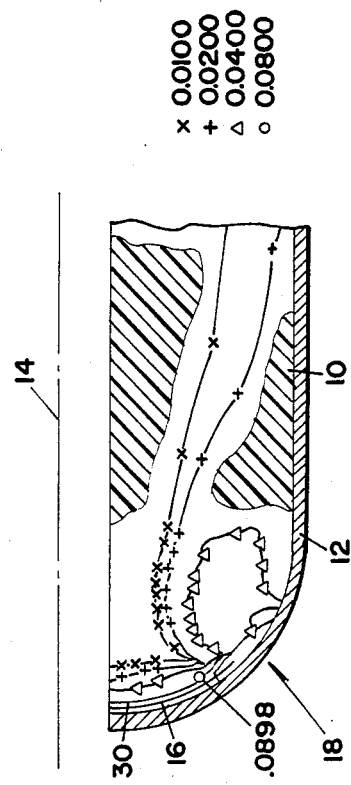
FIG. 5 is a view that is similar to FIG. 4 and shows the induced strain at low temperature with the reinforced hinge.
Figure 4:
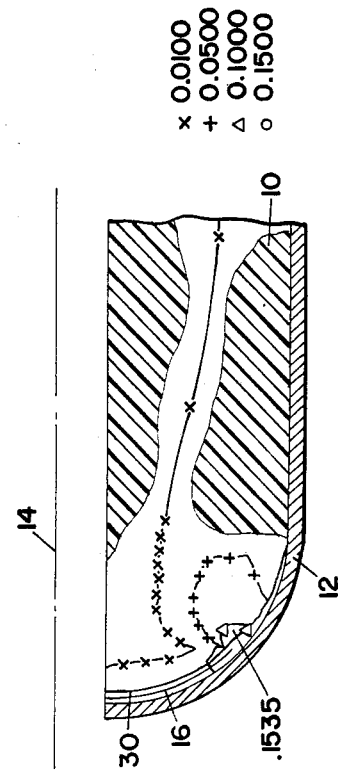
FIG. 4 is a view that is similar to FIG. 2 and shows the induced strain at low temperature with the conventional split-flap hinge.

A similar reduction of the maximum principal strain in the propellant grain 10 occurs under thermal (low temperature) loading. The induced strains for a typical motor configuration are shown in FIGS. 4 and 5 where FIG. 4 shows the induced strain with a conventional hinge and FIG. 5 shows the induced strains with the reinforced or stiffened hinge according to the invention.

Stress analysis methods or techniques that are used to calculate the lines of equal stresses or strains in the solid propellant rocket motors of FIGS. 2–5 are known in the prior art, being used in aerospace, automotive, and construction applications, and form no part of the present invention. Such methods or techniques, therefore, will not be further described herein except to note that the subject of contour-plotting from a topological sense is treated in "THE VNR CONCISE ENCYCLOPEDIA OF MATHEMATICS", published by Van Nostrand Reinhold Company, 450 West 33rd Street, New York, N.Y., 10001 (©VEB Bibliographisches Institut Leipzig, 1975).

Thus, in accordance with the invention, there has been provided a low cost and low mass support system for the unpressurized propellant grain in a high axial acceleration environment. The reduction in stress/strain in the propellant grain by local reinforcement, as described, minimized the amount of propellant that is lost in the motor with minimal inert weight penalty.

With this description of the invention in detail, those skilled in the art will appreciate that modifications may be made in the invention without departing from the spirit thereof. Therefore, it is not intended that the scope of the invention be limited to the specific embodiments illustrated and described. Rather, it is intended that the scope of the invention be determined by the scope of the appended claims.

What is claimed is:

1. A support system for a solid propellant rocket motor comprising,
   an elongated axisymmetrical case having a concave forward inner wall,
   a solid propellant grain contained within said case, said grain having a convex forward end surface conforming in shape to the concave forward inner wall of said case,
   a circular concave piece of material bonded to said forward end surface of said propellant grain,
   a first annular piece of material bonded to said forward end surface of said propellant grain aft of and spaced from said circular concave piece of material,
   said circular concave piece of material and said first annular piece of material being made of chopped fibers of insulating material in a rubber matrix, a second annular piece of insulating material extending aft from said circular concave piece of material and overlapping a substantial portion of the adjacent surface of said first annular piece of material, said second annular piece of insulating material being bonded to said circular concave piece of material, said forward end surface of said propellant grain, and said second annular piece of material, a third annular piece of insulating material, said third annular piece of insulating material forming a hinge being U-shaped and having first and second skirts extending aft with a first skirt bonded to said second annular piece of material, said second and third annular pieces of insulating material being fabric reinforced, and a fourth annular piece of insulating material positioned between said third annular piece of insulating material and the inner forward end wall of said case and bonded on one side to the second skirt of said third annular piece of material and bonded on the other side to the inner forward end wall of said case, said fourth annular piece of insulating material being made of powder filled polyisoprene.

2. A support system as defined by claim 1 further including a lining of insulating material on the concave forward inner wall of said case adjacent said circular concave piece of material.

3. A support system as defined in claim 1 wherein said second and third pieces of insulating material are made of fabric reinforced polyisoprene.

4. A support system as defined by claim 3 wherein the fabric of which said second and third pieces of insulating material are made is an aramid.

5. A support system as defined by claim 4 wherein the aramid of which the fabric of said second and third pieces of insulating material are made of is KEVLAR.

6. A support system as defined by claim 3 wherein the fabric of which said second and third pieces of insulating material are made is graphite.

7. A support system as defined by claim 3 wherein the fabric of which said second and third pieces of insulating material are made is glass.

* * * * *